(12) United States Patent
Maeda

(10) Patent No.: US 7,791,668 B2
(45) Date of Patent: Sep. 7, 2010

(54) DIGITAL CAMERA

(75) Inventor: Toshiaki Maeda, Yokohama (JP)

(73) Assignee: Nikon Corporation, Tokyo (JP)

( * ) Notice: Subject to any disclaimer, the term of this patent is extended or adjusted under 35 U.S.C. 154(b) by 1056 days.

(21) Appl. No.: 11/322,222

(22) Filed: Jan. 3, 2006

(65) Prior Publication Data

US 2007/0030381 A1 Feb. 8, 2007

(30) Foreign Application Priority Data

Jan. 18, 2005 (JP) .............................. 2005-010591

(51) Int. Cl.
*G03B 13/00* (2006.01)
(52) U.S. Cl. ...................... 348/349; 348/345; 348/354; 348/356; 348/347; 382/190; 382/194
(58) Field of Classification Search ........................ None
See application file for complete search history.

(56) References Cited

U.S. PATENT DOCUMENTS

| 6,888,567 | B2 * | 5/2005 | Watanabe ................. 348/211.8 |
| 2003/0081137 | A1 * | 5/2003 | Yamazaki .................... 348/354 |
| 2004/0207743 | A1 * | 10/2004 | Nozaki et al. .......... 348/333.12 |
| 2004/0240871 | A1 * | 12/2004 | Shinohara ................... 396/104 |

2005/0088538 A1 4/2005 Nozaki et al.

FOREIGN PATENT DOCUMENTS

| JP | A 08-063597 | 3/1996 |
| JP | A 09-251534 | 9/1997 |
| JP | A 10-232934 | 9/1998 |
| JP | A 2001-215403 | 8/2001 |
| JP | A 2003-307669 | 10/2003 |
| JP | A 2003-315665 | 11/2003 |
| JP | A 2004-037733 | 2/2004 |

* cited by examiner

*Primary Examiner*—Sinh Tran
*Assistant Examiner*—Paul Berardesca
(74) *Attorney, Agent, or Firm*—Oliff & Berridge PLC

(57) ABSTRACT

A digital camera includes: an evaluation value calculation unit that calculates a focal point evaluation value that changes in correspondence to a position assumed by a focus lens based upon image signals; a focal adjustment unit that executes an AF search by detecting a focus match position based upon resulting focal point evaluation values and driving the focus lens to the focus match position; a face recognition unit that recognizes a face of a person in an image by analyzing the image signals; a distance calculation unit that determines an approximate distance to the face based upon the recognized face size; and a lens position determining unit that determines a focus lens position to be set as a start point of the AF search by the focal adjustment unit based upon the approximate distance to the face having been determined by the distance calculation unit.

11 Claims, 4 Drawing Sheets

| FACE AREA SIZE / ZOOM POSITION | 10 [pixel] | 30 [pixel] | 50 [pixel] |
|---|---|---|---|
| WIDE-ANGLE | 1.5 [m] | 1.0 [m] | 0.5 [m] |
| MIDRANGE | 2.4 [m] | 1.6 [m] | 0.8 [m] |
| TELEPHOTO | 3.0 [m] | 2.0 [m] | 1.0 [m] |

DIGITAL CAMERA

INCORPORATION BY REFERENCE

The disclosures of the following priority application and publications are herein incorporated by reference Japanese Patent Application No. 2005-010591 filed Jan. 18, 2005

Japanese Laid Open Patent Publication No. 2001-215403

Japanese Laid Open Patent Publication No. H08-063597

Japanese Laid Open Patent Publication No. H09-251534

Japanese Laid Open Patent Publication No. H10-232934

BACKGROUND OF THE INVENTION

1. Field of the Invention

The present invention relates to a digital camera that executes AF (autofocus) controlled by adopting a contrast method so as to achieve a faster focus match when photographing a person.

2. Description of Related Art

In the contrast AF control, image signals are obtained by capturing an image of a subject with an image sensor such as a CCD, extracting a component in a predetermined spatial frequency band in the signals contained within a predetermined AF area and a focal point evaluation value is calculated by integrating the absolute values. The focal point evaluation value indicates a quantity corresponding to the contrast in the focal point detection area, and the value increases as the contrast level rises. Since the contrast of the image becomes higher as the focus lens assumes a position closer to the focus match position, the lens position at which the focal point evaluation value peaks (hereafter referred to as the peak position) is determined, the peak position is judged to be the focus match position and the focus lens is driven to this focus match position.

When detecting the peak position (AF search) in the contrast method, the so-called hill-climbing control is executed. The hill-climbing control is executed by calculating the focal point evaluation value over a predetermined sampling pitch while driving the focus lens along the optical axis. The direction along which the lens is to be driven to move is determined by comparing the current focal point evaluation value with the preceding evaluation value and data are continuously sampled along the direction in which the evaluation value increases until the peak position (the top of the hill) is detected (see, for instance, Japanese Laid Open Patent Publication No. 2003-315665). Methods alternative to the hill-climbing control include the full range scanning method whereby the focus lens is driven from the infinity side to the close-up side or vice versa, the focal point evaluation value is calculated and stored each time the focus lens has moved over a distance matching a predetermined sampling pitch, and the plurality of focal point evaluation values having been stored are evaluated to determine the peak position upon completing the scan (see, for instance, Japanese Laid Open Patent Publication No. 2003-307669).

There are cameras adopting the contrast method described above, which achieve an improvement in the focus matching accuracy when photographing a person by detecting skin color in the image and selecting an AF area based upon the detection results (see, for instance, Japanese Laid Open Patent Publication No. 2004-037733). There are also digital cameras that detect the face of a person, i.e., the subject in an image, detect the person's eyes based upon the information corresponding to the detected face and execute AF control so as to achieve focus on the detected eyes (see, for instance, Japanese Laid Open Patent Publication No. 2001-215403).

The face of a person in an image may be extracted by extracting a face candidate area that fits a face shape and determining a face area within the extracted area, instead of through the skin color detection (see, for instance, Japanese Laid Open Patent Publication No. H8-063597). As a further alternative, templates each representing one of a plurality of face shapes may be prepared in advance, a correlation between a template and an image may be calculated and a face may be extracted based upon the correlational value having been calculated. Japanese Laid Open Patent Publication No. H9-251534 and Japanese Laid Open Patent Publication No. H10-232934 also disclose technologies related to face recognition and eye detection.

SUMMARY OF THE INVENTION

While highly accurate focus matching results are normally achieved through the contrast AF control described above, it takes a greater length of time to detect the focus match position because of the nature of the control method, compared to, for instance, the phase difference detection method. Accordingly, a function that allows focus to be achieved quickly on the face of a person being photographed under control executed by adopting the contrast method is eagerly awaited.

According to the 1st aspect of the invention, a digital-camera comprises: an image-capturing unit that receives light transmitted through a photographic optical system and outputs image signals; a lens drive unit that moves a focus lens constituting the photographic optical system along an optical axis; an evaluation value calculation unit that calculates a focal point evaluation value that changes in correspondence to a position assumed by the focus lens based upon the image signals; a focal adjustment unit that executes an AF search by repeatedly engaging the image-capturing unit and the evaluation value calculation unit in operation as the focus lens is made to move along the optical axis by the lens drive unit, detecting a focus match position based upon resulting focal point evaluation values and driving the focus lens to the focus match position; a face recognition unit that recognizes a face of a person in an image by analyzing the image signals; a distance calculation unit that determines an approximate distance to the face based upon the size of the recognized face; and a lens position determining unit that determines a focus lens position to be set as a start point of the AF search by the focal adjustment unit based upon the approximate distance to the face having been determined by the distance calculation unit.

According to the 2nd aspect of the invention, in the digital camera according to the 1st aspect, it is preferred that the lens position determining unit determines the focus lens position to be set as the start point of the AF search based upon the distance having been determined by the distance calculation unit and a zoom condition of the photographic optical system.

According to the 3rd aspect of the invention, in the digital camera according to the 1st aspect, it is preferred that the lens position determining unit determines the focus lens position to be set as the start point so that a range over which the lens moves during the AF search increases when the size of the recognized face is smaller.

According to the 4th aspect of the invention, in the digital camera according to the 1st aspect, it is preferred that the lens position determining unit selects a face with a largest size if a plurality of faces are recognized in a single image by the face recognition unit and determines the focus lens position to be set as the start point based upon the approximate distance corresponding to the largest size face.

According to the 5th aspect of the invention, in the digital camera according to the 1st aspect, it is preferred that the lens position determining unit also determines a focus lens position to be set as an end point of the AF search.

According to the 6th aspect of the invention, in the digital camera according to the 1st aspect, it is preferred that the distance calculation unit includes a table correlating the face size with the approximate distance to the face and ascertains the approximate distance to the face by referencing the table.

According to the 7th aspect of the invention, in the digital camera according to the 1st aspect, it is preferred that the start point of the AF search determined by the lens position determining unit corresponds to a position offset from a position corresponding to an actual distance to the face that is estimated by a predetermined extent along a direction opposite from a direction of the AF search.

According to the 8th aspect of the invention, in the digital camera according to the 1st aspect, it is preferred that the evaluation value calculation unit calculates the focal point evaluation value by designating an area corresponding to the face of the person recognized by the face recognition unit as an AF area.

According to the 9th aspect of the invention, in the digital camera according to the 1st aspect, it is preferred that the evaluation value calculation unit splits a photographic image plane into a predetermined plurality of areas and calculates the focal point evaluation value by designating an area among the plurality of areas that contain the face of the person recognized by the face recognition unit as a selected AF area.

According to the 10th aspect of the invention, in the digital camera according to the 1st aspect, it is preferred that the focal adjustment unit starts the AF search by adopting a so-called hill-climbing method from the AF search start point determined by the lens position determining unit.

According to the 11th aspect of the invention, in the digital camera according to the 1st aspect, it is preferred that the focal adjustment unit starts and AF search scan by adopting a scanning method from the AF search start point determined by the lens position determining unit.

According to the 12th aspect of the invention, in the digital camera according to the 11st aspect, it is preferred that the focal adjustment unit scans over a predetermined distance range from the AF search start point determined by the lens position determining unit.

According to the 13th aspect of the invention, in the digital camera according to the 1st aspect, it is preferred that the lens position determining unit sets the AF search start point further toward an infinity side when the size of the recognized face is smaller.

DESCRIPTION OF PREFERRED EMBODIMENT

An embodiment of the present invention is now explained in reference to FIGS. 1 through 5.

Figure 1:
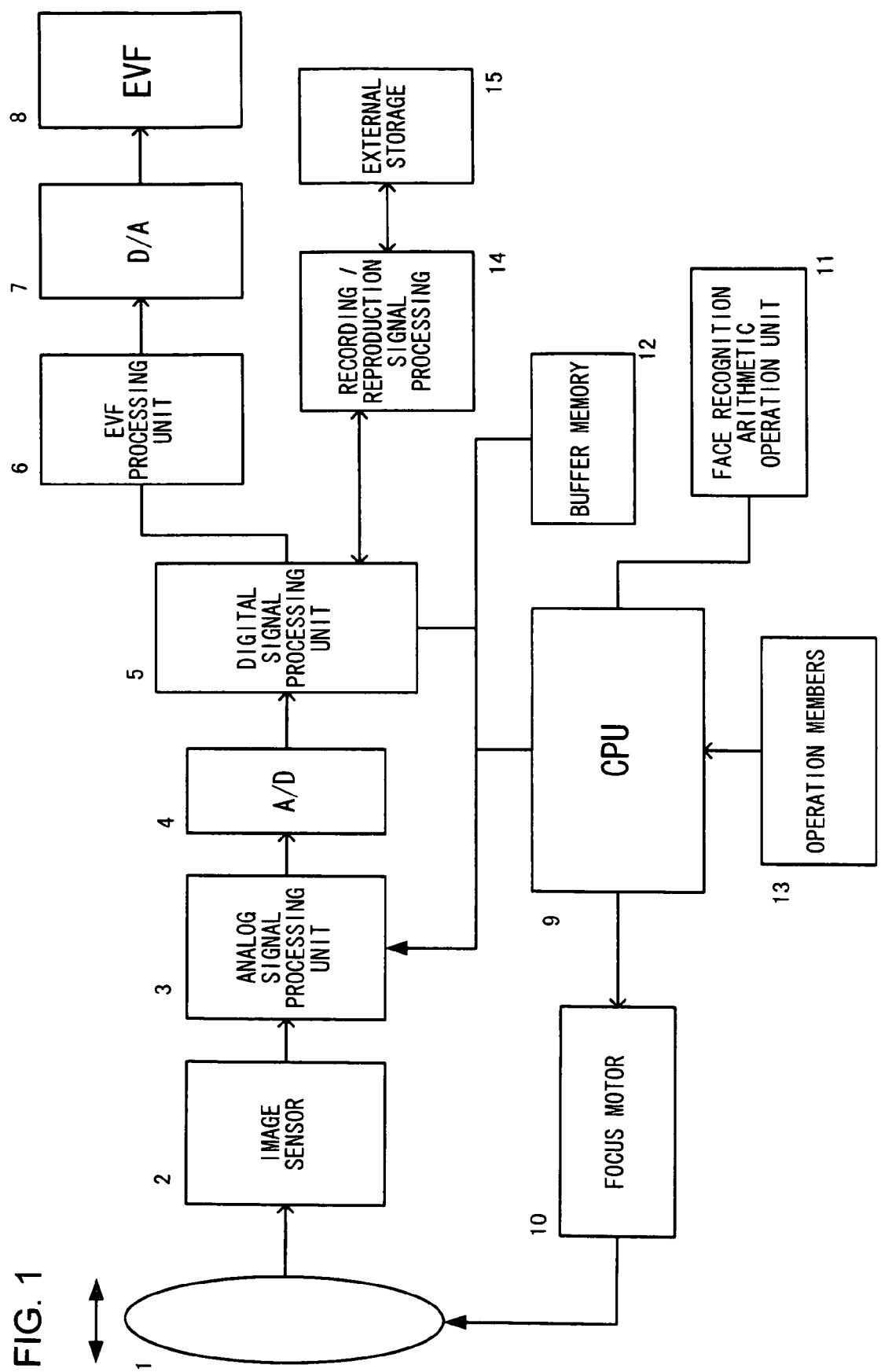
FIG. 1 is a control block diagram of the digital camera achieved in an embodiment of the present invention.

FIG. 1 is a functional block diagram of the digital still camera achieved in the embodiment. Reference numeral 1 indicates a photographic optical system that includes a focus lens, and an image is formed at a light receiving surface of an image sensor (an image-capturing element) 2 with a subject light flux having been transmitted through the photographic optical system 1. The image sensor 2 is a photoelectric conversion element that outputs electrical signals indicating the level of light intensity in the subject image formed on the light receiving surface. The image sensor may be a solid-state image sensor such as a CCD type sensor or a MOS type sensor. The image signals output from the solid-state image sensor 2 are input to an analog signal processing unit 3 where they undergo processing such as correlated double sampling processing (CDS processing).

The image signals having undergone the processing at the analog signal processing unit 3 are then converted to digital signals at an A/D converter 4 and the digital signals are stored into a buffer memory 12 on a temporary basis. The buffer memory 12 is a frame memory capable of storing image-capturing data corresponding to a plurality of photographic frames. The data having been stored in the buffer memory 12 are read out into a digital signal processing unit 5 where they undergo various types of image processing including edge compensation and gamma correction. The digital signal processing unit 5 includes various signal processing circuits such as a gain control circuit, a luminance signal generation circuit and a color difference signal generation circuit, which are all controlled in conformance to instructions provided by a CPU 9.

The digitized data are stored back into the buffer memory 12 and are then recorded into an external storage medium 15 such as a memory card via a recording/reproduction signal processing unit 14. Before the image data are recorded into the storage medium 15, they may be compressed in a predetermined compression format (e.g., the JPEG format) as necessary. The recording/reproduction signal processing unit 14 executes data compression when image data are to be recorded into the external storage medium 15 and it also executes data decompression processing when the compressed image data are to be read from the storage medium 15. The recording/reproduction signal processing unit 14 includes an interface that enables data communication with the storage medium 15.

An EVF (electronic viewfinder) 8 is a liquid crystal finder device at which subject images captured successively are sequentially displayed at the liquid crystal screen thereof, with each image updating of the preceding image (through image display). The photographer is able to decide on the image composition by checking the through image. The through image is displayed at the EVF 8 based upon analog image signals obtained by reading image data stored in the buffer memory 12 into an EVF processing unit 6 and converting the image, now resized for display, to analog image signals via a D/A converter 7.

The CPU 9 includes arithmetic operation units such as an AE arithmetic operation unit, an AWB arithmetic operation unit and an AF arithmetic operation unit. The AE arithmetic operation unit executes automatic exposure calculation to determine the optimal exposure with which the subject should be photographed based upon the image signals provided by the A/D converter 4. The AWB arithmetic operation unit sets white balance adjustment gains based upon the image signals (signals corresponding to the R, G and B color components) provided by the A/D converter 4. The AF arithmetic operation unit executes AF calculation by using the image signals provided by the A/D converter 4. Based upon the results of the calculation executed by the AF arithmetic operation unit, the CPU 9 drives the focus lens constituting part of the photographic optical system 1 via a focus motor 10. The AF arithmetic operation will be explained later in detail. The focus motor 10 may be, for instance, a stepping motor.

Figure 2:
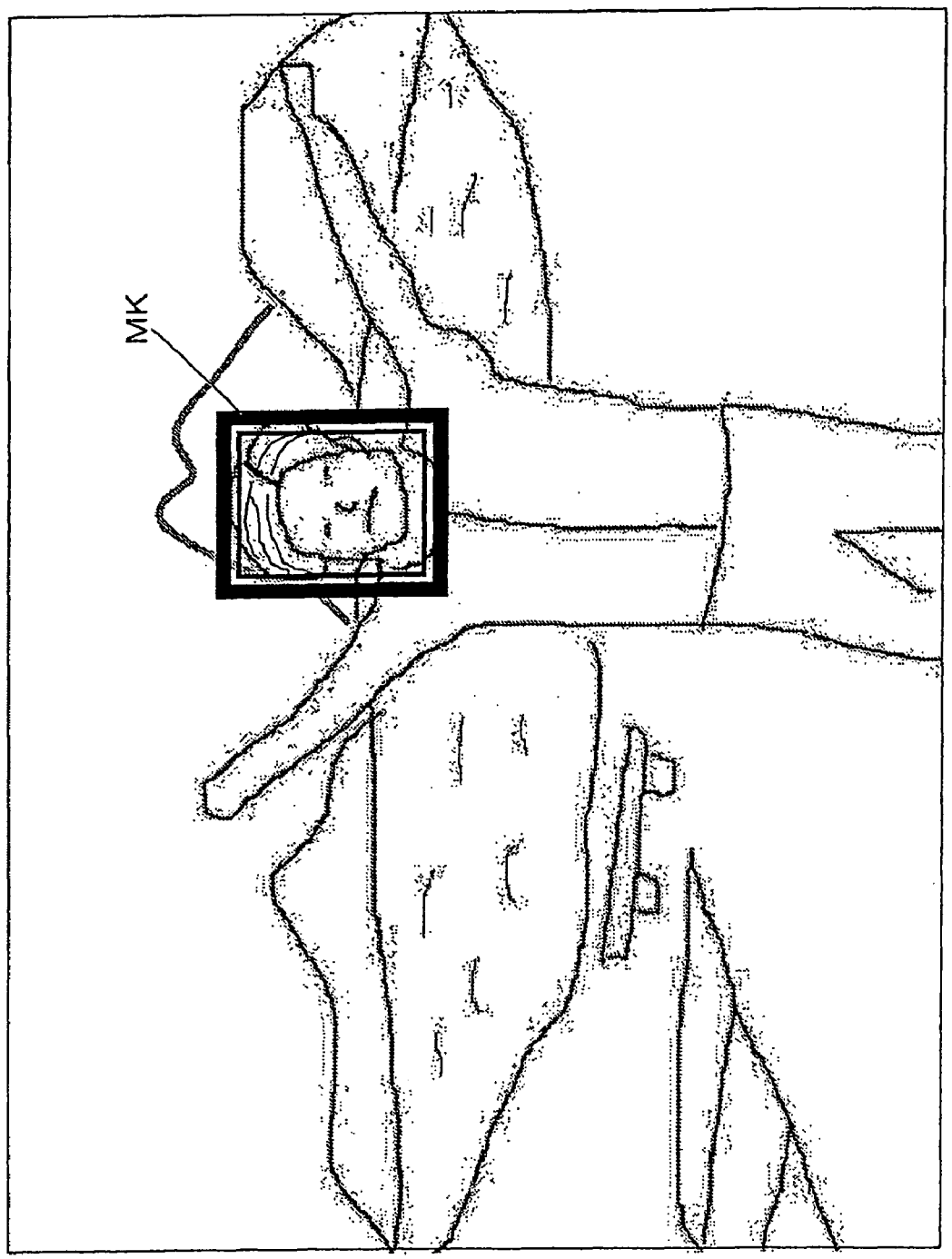
FIG. 2 presents an example of an image containing a face area mark displayed at the EVF.

A face recognition arithmetic operation unit 11 recognizes a person's face in the image by adopting a method of the known art such as that in the Description of Related Art, and once a face is successfully recognized, it inputs to the CPU 9 the coordinates indicating the position and the size of an area (rectangular area) containing the recognized face. The image that undergoes the face recognition is an image prepared for the through image display. Namely, the CPU 9 recognizes the face of a person, i.e., the subject, and obtains the coordinates of the face area corresponding to the size of the face by executing image processing on the image data for the through image display. As the coordinates are input thereto from the face recognition arithmetic operation unit 11, the CPU 9 creates an image by superimposing a face area mark over the image for the through image display based upon the coordinates and displays the image thus created at the EVF 8, as shown in FIG. 2. MK in the figure indicates the face area mark.

A plurality of operation members 13 are connected to the CPU 9. The operation members 13 include a power switch through which power to the camera is turned on/off, a halfway press switch which enters an ON state in response to a halfway press operation of a shutter release button, a full press switch that enters an ON state in response to a full press operation of the shutter release button and a mode switch operated to select various modes.

Next, the AF arithmetic operation (AF control) executed in the embodiment is described in detail.

An AF area is set in advance at a given location or at a plurality of locations within the photographic plane, and contrast AF control is executed based upon image signals obtained in the AF area. In the embodiment, a face area is designated as an AF area in a face recognition AF mode, as detailed later.

By taking advantage of the correlation between the extent of blur to manifest in an image and the contrast in the image, focal adjustment is executed under contrast control based upon the contrast in the image, which peaks when the focal point is optimally adjusted. The contrast level can be evaluated in correspondence to the level of the high-frequency component in the image signal. Accordingly, the AF arithmetic operation unit of the CPU 9 includes a digital filter that extracts a high-frequency component in a predetermined band in each image signal obtained by capturing an image. The absolute values of the high-frequency component extracted with the digital filter are integrated in each AF area, and the integral value is used as a focal point evaluation value.

The focal point evaluation value indicates the contrast in the image, i.e., a quantity that changes in correspondence to the state of focal adjustment at the focus lens, and assumes the largest value (peak value) when a focus match is achieved and the contrast is at the highest level. Accordingly, a focus match can be achieved at the subject within the AF area by determining the lens position at which the focal point evaluation value peaks and driving the focus lens to this position. In the following explanation, the operation executed to determine the lens position at which the focal point evaluation value peaks is referred to as an AF search.

The AF search may be executed by adopting the hill-climbing method or the full range scanning method. In the hill-climbing method, the focal point evaluation value is calculated over a predetermined sampling pitch while moving the focus lens and each focal point evaluation value having been calculated is compared with the evaluation value (stored value) calculated at the preceding sampling point. If the current evaluation value is greater than the preceding evaluation value, the evaluation value is yet to peak and accordingly, data are continuously sampled by moving the focus lens along the same direction. If the current evaluation value is smaller than the preceding evaluation value, the evaluation value has already peaked and is moving further away from the peak. Accordingly, data are continuously sampled by moving the focus lens along the opposite direction. By repeatedly executing this operation, the focus lens can ultimately be set to the peak position (the top of the hill).

In the full range scanning method, the focus lens is driven to scan along a given direction, i.e., from the infinity side through the close-up side, the focal point evaluation value is determined as the focus lens being driven moves by a distance matching a predetermined sampling pitch, and the focal point evaluation value thus determined is stored. Once the scanning drive is completed, the plurality of focal point evaluation values having been stored are analyzed, the peak position is determined and the focus lens is moved to the peak position designated as the focus match position.

Figures 3, 4:
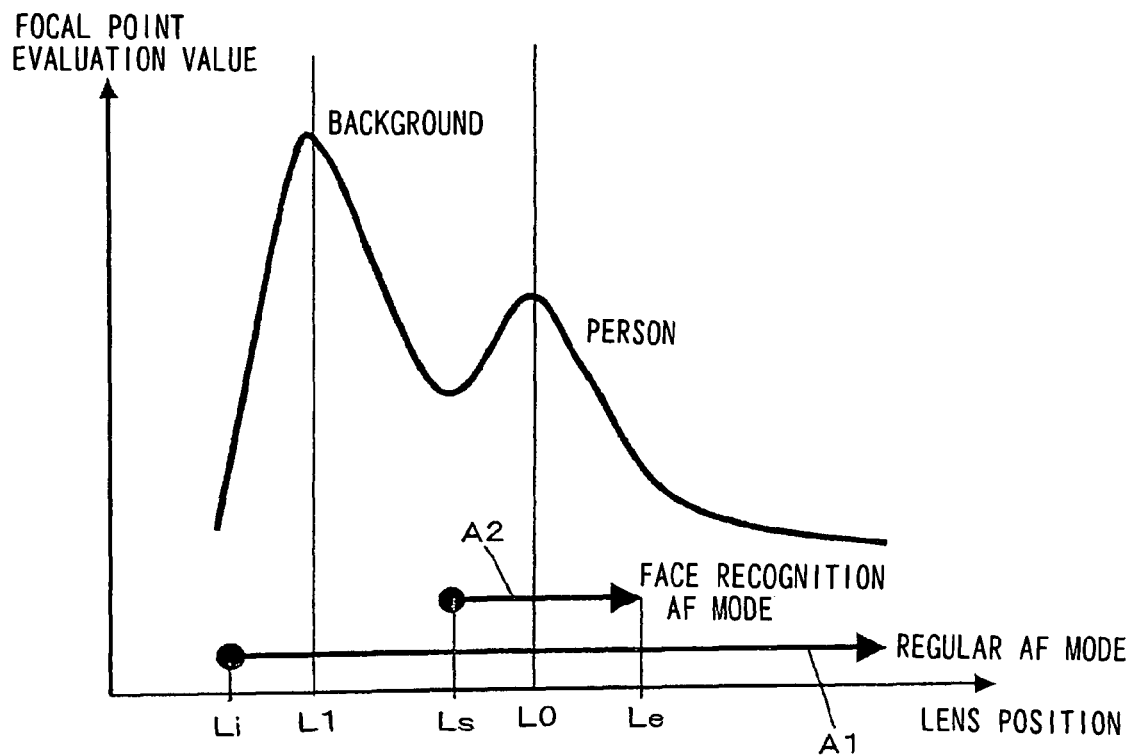
FIG. 3 presents an example of a relationship that may be achieved between the lens position (distance) and the focal point evaluation value.
FIG. 4 shows a table that correlates the distance representing the AF search start point with specific combinations of the face area size and the zoom position.

FIG. 3 presents an example of a relationship that may be observed between the focus lens position and the focal point evaluation value. The relationship in this example reflects the photographing conditions shown in FIG. 2, in which a person standing to the front of a background object (mountain) is photographed. While the focal point evaluation value peaks at two positions, one corresponding to a distance L0 over which the person is present and the other corresponding to a distance L1 over which the background object is present, the peak that should be detected corresponds to L0.

The greatest disadvantage of the contrast method is that it takes a long time to achieve the focus match. In other words, it is necessary to select a small sampling pitch to assure a high level of peak position detection accuracy in the AF search, and as a result, the focal point evaluation value needs to be calculated many times, requiring a great length of time before the peak position is detected. In the case of the full range scanning method, the full search range must be set from the infinity end through the close-up end, and thus, a long time elapses before the search is completed. While a focus match can be achieved more quickly without lowering the focus matching accuracy by reducing the search range, it is necessary to ascertain an approximate distance to the main subject, i.e., the person, prior to the search to reduce the search range and there is no way of ascertaining the distance in advance in the related art.

In the embodiment, an approximate distance to the main subject is ascertained based upon the face recognition results so as to reduce the search range by setting an AF search start point based upon the approximate distance. The following is a detailed explanation of the embodiment.

As explained earlier, the size of the face area (hereafter referred to as the face area size) within the image is indicated by the face recognition results. Provided that the zoom condition of the photographic optical system 1 can be ascertained, an approximate distance to the main subject, i.e., the person's face, can be estimated based upon the face area size and the zoom condition. Once the approximate distance becomes known, it becomes possible to reduce the AF search range.

Accordingly, a table correlating the approximate distance to the face with the face area size and the zoom position, such as that shown in FIG. 4, is prepared in advance and the table is stored in memory inside the camera. The face area size is indicated by the length (the number of pixels) of either the longitudinal side or the lateral side of the rectangular face area.

It is to be noted that different face area size values may be calculated through different methods that may be adopted to determine the face area for a given subject present over a given distance. However, there should not arise any problems as long as a table such as that in FIG. 4 is prepared by adopting a specific face recognition method and the approximate distance to a face corresponding to the size of the face area ascertained through the specific face recognition method is determined in advance through testing or calculation.

Since the approximate distance in the table is used to set the AF search start point subsequently, it must assume a value that allows a peak to be detected in correspondence to the face without fail when the AF search is started from this distance. Since it is assumed that the search is executed by moving the focus lens toward the close-up side in this example, the approximate distance is set so that the search is started at a position slightly on the infinity side relative to the estimated face position. In other words, the AF search start point corresponds to a position offset from the position corresponding to the actual distance to the face that is estimated by a predetermined extent along the direction opposite from the AF search direction.

Since the size of the face varies from individual to individual and there is a significant difference in the face size between adults and children, it is necessary to set the approximate distance by anticipating this difference and allowing for a safe margin. It is also necessary to take into consideration any tendency that may exist in the particular face recognition method, e.g., the detected face size tends to be smaller or larger than the actual face. In addition, the reliability with which the distance to the face is estimated tends to be lower when the face area size is small, and this tendency becomes more pronounced toward the wide-angle side. Accordingly, the approximate distance is set by taking this point into consideration as well, so that when the face area size is smaller, the search is started further away from the estimated face position toward the telephoto side. Under such circumstances, the search range is bound to become greater as the face area size becomes smaller, but the likelihood of achieving a focus match at the face increases.

It is to be noted that while only three settings, wide, midrange and telephoto are indicated in correspondence to the zoom position in the table, the zoom position may assume finer settings.

Figure 5:
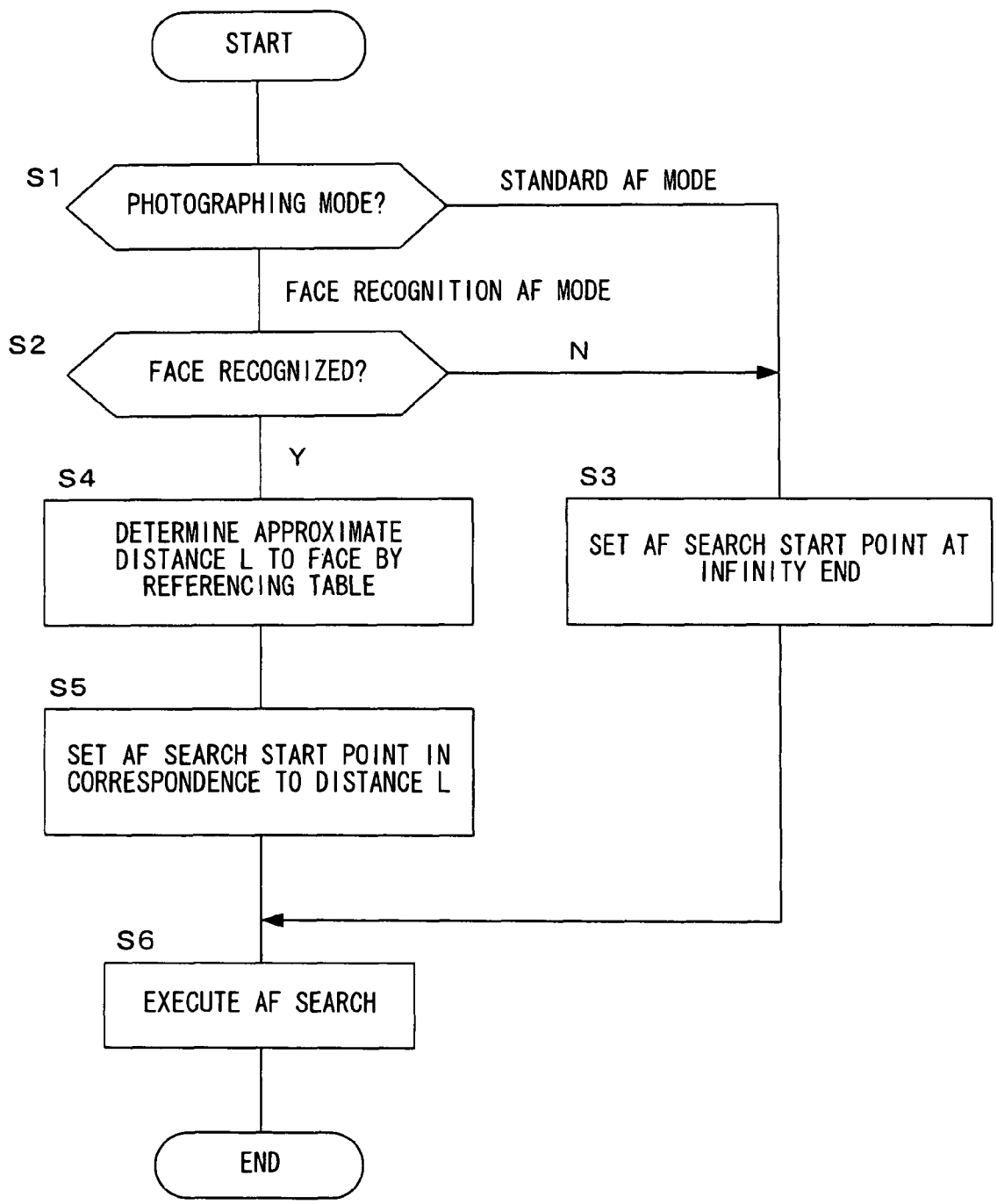
FIG. 5 presents a flowchart of the AF control processing executed in the embodiment.

FIG. 5 presents a flowchart of the AF control procedure executed by the CPU 9.

Before starting up this program, the CPU 9 starts an image-capturing operation, AE processing, white balance processing, and through image display processing, as the power is turned on. These processing operations are repeatedly executed and the AE processing results and the white balance processing results are reflected in the corresponding through image on display. At the same time, face recognition is executed, and if a face is recognized, the face area mark MK is displayed in the through image. The photographer decides on the image composition by checking the through image at the EVF 8 and once he decides on the composition, he presses the shutter release button halfway down.

In response to the halfway press operation, the CPU 9 calls up the program shown in FIG. 5, in conformance to which part of photographing preparation processing is executed. In step S1, a decision is made as to whether a regular AF mode or the face recognition AF mode is set. The photographer is able to select in advance either mode by performing a specific operation. If it is decided that the regular AF mode is currently set, an AF search of the related art is executed without using the face recognition results. Namely, the AF search start point is set at, for instance, an infinity end L1 (see FIG. 3) in step S3, and an AF search is executed in step S6. The scanning method may be either the hill-climbing method or the full range scanning method. In either case, with the start point set at the infinity end L1, the search is executed by moving the focus lens toward the close-up side. The search range assumed at this time is indicated as A1 in FIG. 3. Once the peak position is ascertained, the focus lens is fixed at the peak position. It is to be noted that the search may instead be executed by moving the focus lens from the close-up side toward the infinity side.

If, on the other hand, it is decided that the face recognition AF mode is currently set, the face recognition results available at the current time point are input from the face recognition arithmetic operation unit 11 and a decision is made as to whether or not a face has been recognized in step S2. If no person's face is contained in the image, no face is recognized and accordingly, a negative decision is made in step S2. In addition, if the recognition ends in failure for any reason even though a face is contained in the image, a negative decision is made in step S2. After making a negative decision in step S2, the operation proceeds to step S3 to execute the regular AF control.

If, on the other hand, a face has been recognized, the face area size can be ascertained and in this case, the approximate distance L to the face is ascertained in step S4 by referencing the table shown in FIG. 4 based upon the face area size and the corresponding zoom position. It is to be noted that the zoom position is determined to be the telephoto position, a midrange position or the wide-angle position in correspondence to the focal length of the photographic lens. In step S5, an AF search is started at the start point set in correspondence to the distance Ls (see FIG. 3) ascertained from the table. Namely, the focus lens is first driven to the lens position corresponding to the distance Ls and then, the AF search is executed by moving the focus lens from the start point toward the close-up side (step S6). The AF area set for the AF search is the face area, and the search is executed by calculating the focal point evaluation value by using the signals from the face area among the image signals. Once the peak position is ascertained, the focus lens is fixed at the detected peak position, before the operation makes a return.

As FIG. 3 clearly indicates, the peak at L0 can be detected more quickly by starting the search at the position corresponding to the distance Ls based upon face recognition results, compared to the length of time required to detect the peak by starting the search at the infinity end Li and thus, the length of time required to achieve a focus match is greatly reduced. The peak detection is speeded up regardless of whether the search is executed through the hill-climbing method or the scanning method (adopting the concept of the full range scanning method without actually scanning over the entire range).

If the hill-climbing method is adopted, the search ends as the focus lens is moved back by a slight extent once the focus lens moves past the first peak position (the peak corresponding to L0). If the scanning method is adopted, it is desirable to set the search end point Le at a point further toward the close-up side by a predetermined distance relative to the search start point Ls. In this case, the search is executed over the range A2, which is much smaller than A1. In addition, the range is greatly reduced compared with the range over which a scan is executed from the search start point Ls through the close-up side. Namely, the scan is executed so as to end at the search end point Le instead of from the search start point Ls through the close-up side.

It is to be noted that while the approximate distance to the face is determined by using the table shown in FIG. 4 in the example described above, the distance may instead be determined by substituting specific values for parameters (the face area size and the focal length) in a predetermined arithmetic expression. In addition, while the face area of a face recognized in an image is designated as the AF area, the process of selecting a threshold value or the like to be used to decide whether or not a focus match is achieved is bound to become more complicated if the size of the AF area changes constantly. Accordingly, the image plane may be divided in advance into a plurality of areas of a given size (e.g., the image plane may be split into four equal areas or six equal areas) and one of the split areas containing the face area may be designated as the AF area. In this case, the AF area greater than the face area, often containing relatively high contrast areas such as a portion around the neck or the hair, is set, which is likely to contribute to an improvement in the focus matching accuracy achieved through the AF search.

If the image of the face area is significantly blurred, the face recognition may not be successful. Accordingly, prior to the face recognition, the focus lens may be driven to a position of the hyper-focal length determined in correspondence to the focal length and the aperture value to raise the likelihood of the face area becoming contained in the photographic depth of field and thus increase the reliability of the face recognition.

Also, a plurality of faces may be recognized through the face recognition. In such a case, priority should be given to the subject present on the close-up side so that the face with the greatest face area size, i.e., the face present at the closest position, is selected and the approximate distance to be used to set the search start point is determined based upon the greatest face area size.

As described above, a person's face in an image is recognized by analyzing image signals and if a face is recognized, the approximate distance to the face is ascertained based upon the size of the recognized face. The focus lens position at which the AF search is to start is then determined based upon the distance thus ascertained. As a result, the range of the AF search executed when photographing a person can be reduced and the focus lens can be focused on the person quickly.

The above described embodiment is an example and various modifications can be made without departing from the spirit and scope of the invention.

What is claimed is:

1. A digital camera comprising:
an image-capturing unit that receives light transmitted through a photographic optical system and outputs image signals;
a lens drive unit that moves a focus lens constituting the photographic optical system along an optical axis;
an evaluation value calculation unit that calculates a focal point evaluation value that changes in correspondence to a position assumed by the focus lens based upon the image signals;
a focal adjustment unit that executes an AF search by repeatedly engaging the image-capturing unit and the evaluation value calculation unit in operation as the focus lens is made to move along the optical axis by the lens drive unit, detecting a focus match position based upon resulting focal point evaluation values and driving the focus lens to the focus match position;
a face recognition unit that recognizes a face of a person in an image by analyzing the image signals;
a distance calculation unit that determines an approximate distance to the face based upon a size of the recognized face; and
a lens position determining unit that determines a focus lens position to be set as a start point of the AF search by the focal adjustment unit based upon the approximate distance to the face having been determined by the distance calculation unit and a zoom condition of the photographic optical system, wherein:
the lens position determining unit determines the focus lens position to be set as the start point so that a range over which the focus lens moves during the AF search increases when the size of the recognized face becomes smaller due to the zoom condition of the photographic optical system being closer to a wide-angle side.

2. A digital camera according to claim 1, wherein:
the lens position determining unit selects a face with a largest size if a plurality of faces are recognized in a single image by the face recognition unit and determines the focus lens position to be set as the start point based upon the approximate distance corresponding to the largest size face.

3. A digital camera according to claim 1, wherein:
the lens position determining unit also determines a focus lens position to be set as an end point of the AF search.

4. A digital camera according to claim 1, wherein:
the distance calculation unit includes a table correlating the face size with the approximate distance to the face and ascertains the approximate distance to the face by referencing the table.

5. A digital camera according to claim 1, wherein:
the start point of the AF search determined by the lens position determining unit corresponds to a position offset from a position corresponding to an actual distance to the face that is estimated by a predetermined extent along a direction opposite from a direction of the AF search.

6. A digital camera according to claim 1, wherein:
the evaluation value calculation unit calculates the focal point evaluation value by designating an area corresponding to the face of the person recognized by the face recognition unit as an AF area.

7. A digital camera according to claim 1, wherein:
the evaluation value calculation unit splits a photographic image plane into a predetermined plurality of areas and calculates the focal point evaluation value by designating an area among the plurality of areas that contain the face of the person recognized by the face recognition unit as a selected AF area.

8. A digital camera according to claim 1, wherein:
the focal adjustment unit starts the AF search by adopting a so-called hill-climbing method from the AF search start point determined by the lens position determining unit.

9. A digital camera according to claim 1, wherein:
the focal adjustment unit starts an AF search scan by adopting a scanning method from the AF search start point determined by the lens position determining unit.

10. A digital camera according to claim 9, wherein:
the focal adjustment unit scans over a predetermined distance range from the AF search start point determined by the lens position determining unit.

11. A digital camera according to claim 1, wherein:
the lens position determining unit sets the AF search start point further toward an infinity side when the size of the recognized face is smaller.

* * * * *